United States Patent

Engel

[11] 3,845,464
[45] Oct. 29, 1974

[54] LOW COOLANT INDICATOR
[75] Inventor: Joachim H. Engel, Okemos, Mich.
[73] Assignee: General Motors Corporation, Detroit, Mich.
[22] Filed: Apr. 23, 1973
[21] Appl. No.: 353,564

[52] U.S. Cl. .................. 340/59, 340/244 C, 73/304
[51] Int. Cl. ........................................... G08b 21/00
[58] Field of Search ....... 340/59, 57, 244 B, 244 C, 340/244 E, 244 R; 73/304

[56] References Cited
UNITED STATES PATENTS
| | | | |
|---|---|---|---|
| 2,783,341 | 2/1957 | Wisman | 340/244 R X |
| 3,179,920 | 4/1965 | McGinty | 340/244 C X |
| 3,534,352 | 10/1970 | Gallagher | 340/59 X |

Primary Examiner—Alvin H. Waring
Attorney, Agent, or Firm—K. H. MacLean, Jr.

[57] ABSTRACT

A coolant level indicating system for a vehicle including a warning light, a sensor normally immersed in coolant and a vehicle battery or other power source in circuit with said temperature sensor. The sensor is mounted at a location in the engine remote from the engine water pump to prevent transient coolant level fluctuations caused by the pump from effecting its operation. The temperature sensor includes a variable resistance element heated by the battery which under operation of the engine with a normal high coolant level is immersed in coolant and cooled to maintain the variable resistance element in a high resistance state. When the coolant level decreases, the element is uncovered and consequently its temperature increases. This decreases its resistance to permit sufficient energization of a warning light to visibly indicate the condition to the operator of the vehicle.

2 Claims, 3 Drawing Figures

PATENTED OCT 29 1974　　　　　　　　　　　　　　3,845,464

LOW COOLANT INDICATOR

This invention relates to coolant level indicating systems for vehicles with engines which utilize liquid coolant for cooling. A great majority of modern automobile engines are cooled by circulation of liquid coolant such as water or a water-glycol mixture which flows through water jackets within the engine. A water pump rotated by the engine crankshaft causes this coolant flow. The cooling system further includes a radiator normally mounted adjacent the front of the automobile so that air flowing through the grill passes through the radiator to cool the coolant. The cooling system basically is a closed system having a certain static coolant level, a volume of air to allow for thermal expansion of the coolant and some trapped air in the engine water passages. The coolant level normally changes considerably after the engine is started. Coolant is forced from the radiator into the engine water jackets or passages which are located in the cylinder block and the cylinder heads. After the coolant reaches a predetermined temperature, a thermostat opens to permit flow of coolant from the engine. This causes the coolant level to again change as the coolant now circulates through the radiator as well as the engine. Once the thermostat opens, the coolant level within the water passages of the engine varies with the speed of the water pump which is controlled by engine speed. At higher engine speeds the coolant may change froma pure liquid form to an aerated liquid. This will increase the coolant volume and hence the coolant level.

Coolant level indicators have been utilized previously and have taken various forms. Mechanical float type indicators associated with the radiator outlet tanks have been commonly used. Mechanical indicators of this type are relatively expensive and a location at the radiator outlet tank is unsatisfactory since the coolant level varies greatly at this point due to opening and closing of the thermostat, the changes in engine speed, coolant aeration, vehicle acceleration and deceleration, vehicle directional changes, and the road grade. In fact, the coolant level at the radiator outlet tank will sometimes fall below the water pump inlet to cause the pump to cavitate.

The present invention utilizes a level indicator in the form of a variable resistance element such as a silicone chip or circuit member which is mounted within a cavity adjacent to the water passages of the engine. It is normally immersed in the coolant in the engine. The variable resistance element is connected to the vehicle battery to heat the element. However, when the element is covered by coolant, it is cooled thereby and exhibits its high resistance state as compared to an uncovered and therefore hotter resistance member which has a lower resistance. An indicating light is in circuit with the battery and the variable resistance element to provide a visual indicating display when the resistance of the element diminishes at low coolant level.

The variable resistance element or silicone chip is mounted at the tip of an indicator assembly which is adapted to be threadably inserted within a bore in the engine. The variable resistance element is located in a cavity connected to the engine water passages or jackets. It has been discovered that a location near the rear of the engine is most satisfactory for placing the sensor. This location is most remote from the water pump whose speed is a prime factor effecting the level of the coolant system.

In V-8 type engines commonly used, a desirable location has been found to be between a rear portion of the intake manifold adjacent the rear cylinder head water passage. This location is remote from the water pump and is a high point for the passages in the engine. A small cavity formed in the intake manifold is separated from the cylinder head water passage by an intake manifold gasket. The gasket contains a hole at the bottom of the cavity to admit coolant into the cavity and a slot at the top of the cavity to exhaust air therefrom. Also, the top surface of the cavity is sloped upward toward the slot to eliminate the possibility of air being trapped therein. The level indicator is threadably inserted through a bore in the intake manifold vertically into the cavity. During operation of the engine at a full coolant charge, the variable resistance element will be covered by coolant to provide cooling therefor. The resultant low temperature element consequently has a high resistance.

The remote location of the sensor at the rear of the engine and thus far removed from the water pump minimizes the effect of the speed of the water pump upon the coolant level. Also, because the variable resistance element is mounted in a dead cavity not a part of the flow of coolant through the engine and the hole in the gasket to the cavity is small, the cavity will remain full of coolant even though the coolant level may decrease for a short period.

Therefore, an object of the present invention is to provide a coolant level indicating system for water cooled engines insensitive to transient coolant level changes which may be caused by water pump speed variations or vehicle acceleration and directional changes.

A still further object of the present invention is to provide a coolant level indicating system for water cooled engines including a variable resistance element located within a cavity which is fluidly connected to the water passages of the engine and located remotely from the water pump to minimize the effect of transient coolant level changes.

A still further object of the invention is to provide a coolant level indicating system for water cooled engines including a variable resistance element in circuit with the battery to electrically heat the element which when the cooling system is sufficiently full and the element is immersed in coolant remains at a low temperature level to cause the element to exhibit relatively high resistance but when the element is uncovered due to insufficient coolant in the engine the element will increase in temperature and decrease in voltage to permit an indicator light to be energized.

A still further object of the present invention is to provide a coolant level indicating system for water cooled engines including a heated variable resistance element located within a cavity formed adjacent a water passage of the engine and connected therewith through a thin-walled gasket member having a relatively small opening at the bottom of the cavity for admitting coolant and an opening at the top to permit air to escape the cavity.

Further objects and advantages of the present invention will be more readily apparent from the following detailed description, reference being had to the accompanying drawings in which a preferred embodiment is illustrated.

Figure 1:
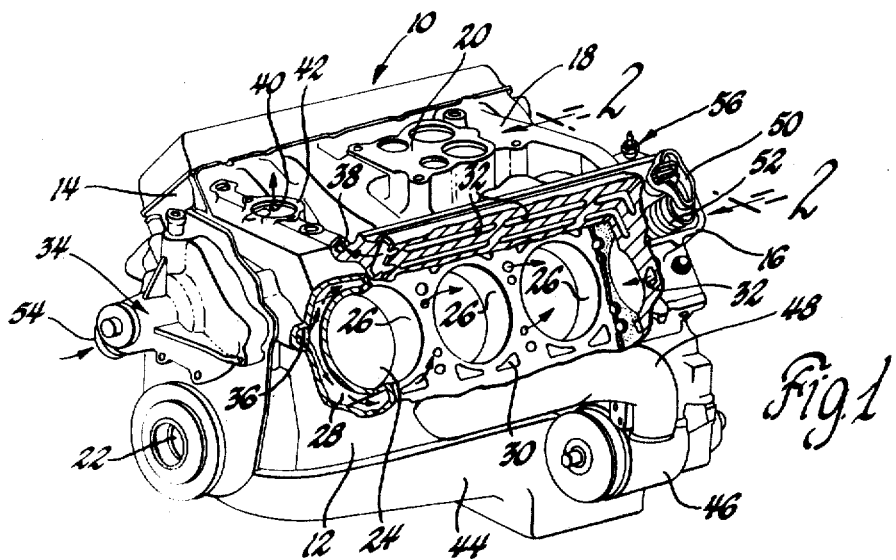
FIG. 1 is a perspective view of an automobile engine partially broken away to show the engine's water pump, water passages, and the general location of the subject coolant level indicator.

In FIG. 1 of the drawings, an automobile engine 10 is illustrated. The engine 10 is an internal combustion type engine having a V configuration with eight cylinders which are common in present day usage. The engine basically includes an engine block 12, right and left cylinder head assemblies 14 and 16, an intake manifold 18 (the carburetor which is adapted to be affixed at location 20 is omitted). The crankshaft 22 of the engine is operably connected to pistons 24 which reciprocate within cylinders 26. The engine block 12 includes water jackets or passages 28 which encircle the cylinders 26 to carry off the heat created by burning gases within the cylinders. The water passages 28 are connected by openings 30 to other water passages 32 within the cylinder head assemblies 14 and 16.

The water or other coolant is pumped through the passages 28 and 32 by a water pump 34 which is driven by the crankshaft 22. More particularly, the coolant passes through an outlet 36 of the water pump 34 into the passages 28 within the cylinder block 12. It then passes through openings 30 into passages 32 within cylinder head 16 and hence through an outlet 38 to a chamber upstream from a temperature regulating thermostat housing 40 (the thermostat is adapted to fit within the opening 42 but has been omitted in the drawing). Further elements of the engine 10, not directly associated with the present invention include the oil pan 44, starter motor 46, exhaust manifold 48, rocker arm 50, and valve spring 52.

It can be seen from FIG. 1 that coolant is first drawn through an inlet 54 into a water pump 34 from a radiator (not shown). The coolant then flows through outlet 36 into passages 28 and subsequently through passages 32. It then flows through an opening 42 and back to the radiator.

Figure 2:
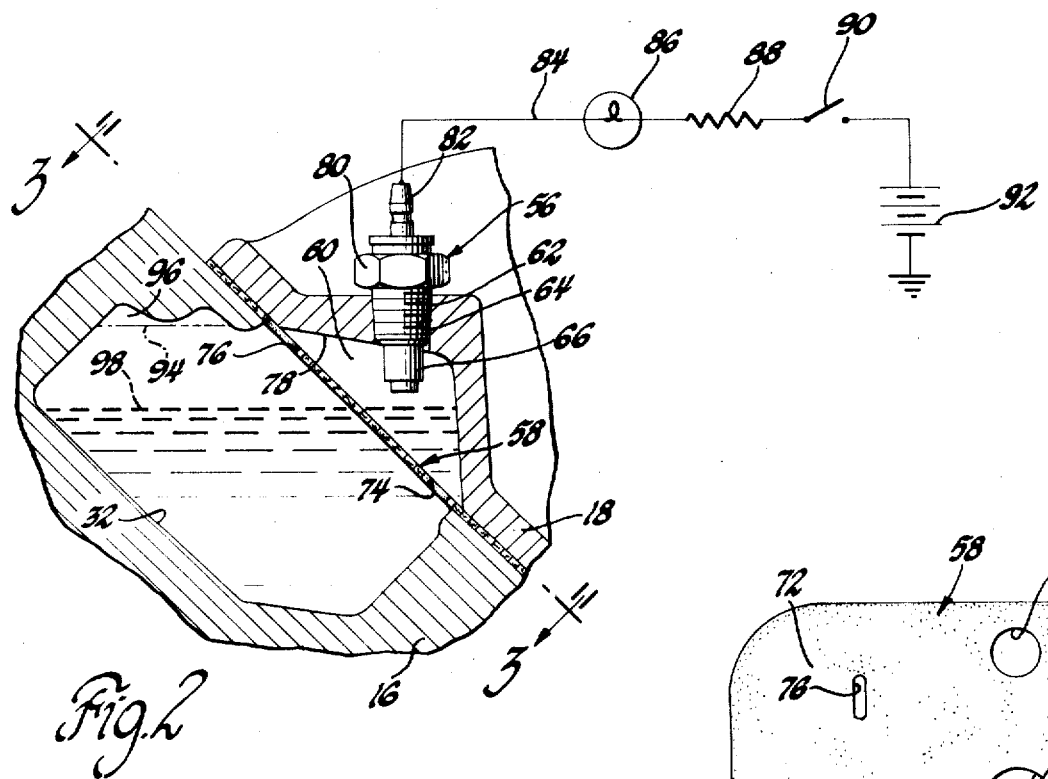
FIG. 2 is a vertical sectioned view taken along section line 2—2 in FIG. 1 and looking in the direction of the arrows.
Figure 3:
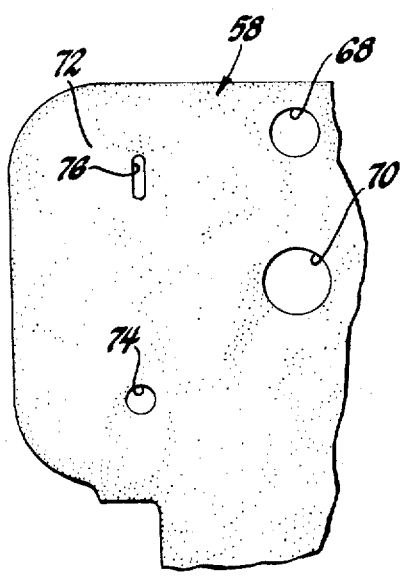
FIG. 3 is a sectioned view of the intake manifold gasket taken along section line 3—3 of FIG. 2 and looking in the direction of the arrows.

A coolant level sensor 56 is shown in FIG. 1 mounted at the rear portion of the engine remote from water pump 34. The coolant indicator 56 is best shown in FIG. 2 which shows part of the left cylinder head 16, intake manifold 18, water passage 32 within the cylinder head 16, and an intake manifold gasket member 58 between the cylinder head 16 and the intake manifold 18. A dead cavity 60 is formed in manifold 18 and covered by the gasket 58. The sensor 56 is threadably secured at 62 through an opening 64 in the intake manifold so as to locate a lower portion 66 of the level indicator 56 in cavity 60. The gasket 58, best shown in FIG. 3, has openings 68 and 70 therethrough which encircle bolt fasteners extending through the intake manifold 18 and into the cylinder head assembly 16. The portion 72 of gasket 58 which covers the cavity 60 has a relatively small opening 74 located near the bottom of the cavity 60 and a slotted hole 76 located at the top of cavity 60. Hole 74 is adapted to permit coolant from passage 32 to flow into cavity 60. The slotted hole 76 permits air to flow from the cavity 60 as the water enters. The upper surface 78 of cavity 60 is sloped upward toward the slotted opening 76 to permit all the air from the cavity 60 to be removed by the entering water. The slotted hole 76 is of elongated form to compensate for casting variations of the cylinder head assembly and the intake manifold and thus to insure that the opening will be at the uppermost portion of cavity 60.

The coolant indicator 56 includes a threaded body 80 in which a contact 82 is mounted in a manner insulating it from the housing 80 and the intake manifold 18. The housing 80, intake manifold 18, and engine block 12 are grounded as is one terminal of the vehicle power source or battery. The contact 82 extends through the housing 80 and is connected to a variable resistance thermally responsive element within the lower portion 66. Contact 82 is connected by a conductor 84 to an indicator lamp 86 in the passenger compartment of the vehicle. The lamp 86 is in circuit with a resistor 88 which is in turn connected to the ignition switch 90 and the other terminal of battery 92.

When the ignition switch 90 is closed, a circuit is completed from ground through the battery 92, ignition switch 90, resistor 88, indicator lamp 86, conductor 84, contact 82 and through the variable resistance elements within portion 66 and hence to the housing 80 and to ground. This continuously energized circuit heats the variable resistance element. However, when the coolant level within passage 32 and the cavity 60 is sufficient to cover the coolant indicator and immerse the variable resistance element, it is kept relatively cool thereby. When a silicone element is used as in the preferred embodiment of the invention, its resistance is relatively high at lower temperatures created because of the aforesaid cooling. The line 94 in FIG. 2 represents the coolant level under full charge conditions, the relatively small space 96 above the coolant level shows the possibility of a very minor quantity of trapped air in the water passage 32. At the level indicated by line 94, the cavity 60 is completely filled with coolant and the portion 66 of indicator 56 is immersed in coolant.

As the coolant level in passage 32 decreases to a level indicated by broken line 98, the water drains through opening 74 from cavity 60 and uncovers the lower portion 66 of the coolant indicator 56. This causes the silicone element to heat up and its resistance to decrease. This lowered resistance permits an increased current through the indicating lamp 86 and resistor 88 which causes the lamp 86 to be energized and visibly warn the vehicle operator that the coolant level has decreased significantly.

In a proposed embodiment of the present coolant indicating system, a silicone chip circuit element is cemented to the tip of a sensor. When surrounded and cooled by liquid, it has relatively high resistance. When the liquid level falls below levels necessary to cover the silicone element, the temperature of the chip will be increased and its resistance quickly decreases to a level low enough to energize the light. A 6-volt bulb No. 55 is proposed for indicator lamp 86 and an eight-ohm resistance for resistor 88 to reduce the voltage from the 12-volt level of commonly used batteries 92. It has been found that the coolant level indicator mounted in the disclosed cavity at the rear intake manifold is least effected by transient coolant level variations mentioned previously. The indicating lamp 86 begins to indicate a low coolant level by intermittant blinking at a level about 1½ quarts low. However, with further loss of coolant from systems normally having between 16-20 quarts of coolant depending on the size of the engine to a level about 4 quarts low, the indicator lamp 86 will glow continuously. The vehicle operator is then advanced to add water or water-glycol to the radiator.

Although the illustrated embodiment is preferred, other embodiments may be adapted.

What is claimed as follows:

1. A coolant level indicating assembly for a vehicle with an engine having a front-mounted water pump and a water passage for cooling the engine comprising: wall means separating said water passage from a cavity formed in an upper, rearward portion of said engine which is remotely located from said front-mounted water pump; said separator wall having opening means therethrough including a lower portion adapted to pass coolant between said water passage and said cavity in response to changes in the coolant level in the engine and an upper portion adapted to permit the discharge of air from said cavity as the coolant level therein increases; a temperature responsive sensor attached to said engine having a portion extending into an upper region of said cavity; said portion of the sensor including a variable resistance element in circuit with the vehicle electrical power source and being positioned in said cavity to be covered by coolant when there is a sufficient coolant volume in said engine; said variable resistance element being characterized by a substantial change in resistance between conditions when it is covered by coolant and when it is uncovered by coolant; means in circuit with said variable resistance element for indicating an insufficient coolant volume corresponding to an uncovered operative condition.

2. A coolant level indicating assembly for a vehicle with an engine having a front-mounted water pump and a water passage for cooling the engine comprising: an intake manifold gasket overlying an opening to said water passage; said opening being located in an upper, rearward portion of the engine which is remotely located from said water pump; an intake manifold overlying said gasket and forming a small cavity therein separated from said water passage by said gasket; said gasket having a lower opening of relatively small diameter with respect to the volume of said cavity to pass coolant at a relatively slow rate between said cavity and said water passage with changes in the coolant level in the engine; said gasket also having an opening adjacent the top surface of said cavity for discharging air therefrom as the coolant level increases; a temperature-responsive sensor attached to said intake manifold and extending vertically through the top surface of said cavity; said sensor having a variable resistance element in the upper region of said cavity which is in circuit with the vehicle electrical power source, said resistance element characterized by a substantial change in resistance between conditions when it is covered by coolant and when it is uncovered by coolant; means in circuit with said variable resistance element for indicating an insufficient coolant volume which corresponds to the uncovered condition of the resistance element.

* * * * *